United States Patent
Libretto

(10) Patent No.: US 6,866,241 B1
(45) Date of Patent: Mar. 15, 2005

(54) PORTABLE FLOW CONTROL VALVE

(76) Inventor: Frank Libretto, 30 Rugby Rd., Westbury, NY (US) 11590

( * ) Notice: Subject to any disclaimer, the term of this patent is extended or adjusted under 35 U.S.C. 154(b) by 0 days.

(21) Appl. No.: 10/358,716

(22) Filed: Feb. 5, 2003

(51) Int. Cl.7 ................................................. F16K 7/06
(52) U.S. Cl. ............................................. 251/8; 251/7
(58) Field of Search ................................... 251/7, 8, 9

(56) References Cited

U.S. PATENT DOCUMENTS

| | | | | |
|---|---|---|---|---|
| 597,443 A | * | 1/1898 | Thomas | 251/8 |
| 950,111 A | * | 2/1910 | Miner | 251/8 |
| 1,337,247 A | * | 4/1920 | Maier | 251/8 |
| 2,865,591 A | * | 12/1958 | Holinshead | 251/8 |
| 3,410,517 A | * | 11/1968 | Wall | 251/8 |
| 3,544,060 A | * | 12/1970 | Stoltz et al. | 251/9 |
| 4,978,100 A | * | 12/1990 | Peurifoy | 251/8 |
| 5,351,932 A | * | 10/1994 | von Hermann | 251/8 |

FOREIGN PATENT DOCUMENTS

| | | | | |
|---|---|---|---|---|
| FR | 68337 | * | 8/1865 | 251/8 |
| GB | 639646 | * | 7/1950 | 251/8 |
| IT | 437702 | * | 7/1948 | 251/8 |

* cited by examiner

*Primary Examiner*—Paul J. Hirsch

(57) ABSTRACT

A portable flow control valve for allowing a user to control fluid flow from a conduit from anywhere along the hose. The portable flow control valve includes a frame assembly being designed for being selectively positioned around the conduit. A clamping member is coupled to the frame assembly whereby the clamping member is slidably positionable with respect to the frame assembly. The clamping member is designed for engaging the conduit whereby the clamping member is for compressing the conduit between the frame assembly and the clamping member for controlling the rate of flow of the fluid through the conduit beyond the clamping member.

11 Claims, 4 Drawing Sheets

PORTABLE FLOW CONTROL VALVE

BACKGROUND OF THE INVENTION

1. Field of the Invention

The present invention relates to pinch clamps and more particularly pertains to a new portable flow control valve for allowing a user to control fluid flow from a conduit from anywhere along the conduit.

2. Description of the Prior Art

The use of pinch clamps is known in the prior art. U.S. Pat. No. 4,077,601 describes a device for selectively pinching a hose to control the flow of water from the hose. Another type of pinch clamp is U.S. Pat. No. 2,366,424 having a clamp bar that compresses a tube against the frame bar to secure the tube to the frame bar. U.S. Pat. No. 3,584,830 has a clamp for engaging and pinching tubing to restrict flow through the tubing.

SUMMARY OF THE INVENTION

An object of the present invention is to provide a new portable flow control valve that allows the user to control the flow of water from a hose from a desired location along the length of the hose.

Even still another object of the present invention is to provide a new portable flow control valve that can be removed from the conduit and moved to another conduit as needed.

To this end, the present invention generally comprises a frame assembly being designed for being selectively positioned around the conduit. A clamping member is coupled to the frame assembly whereby the clamping member is slidably positionable with respect to the frame assembly. The clamping member is designed for engaging the conduit whereby the clamping member is for compressing the conduit between the frame assembly and the clamping member for controlling the rate of flow of the fluid through the conduit beyond the clamping member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
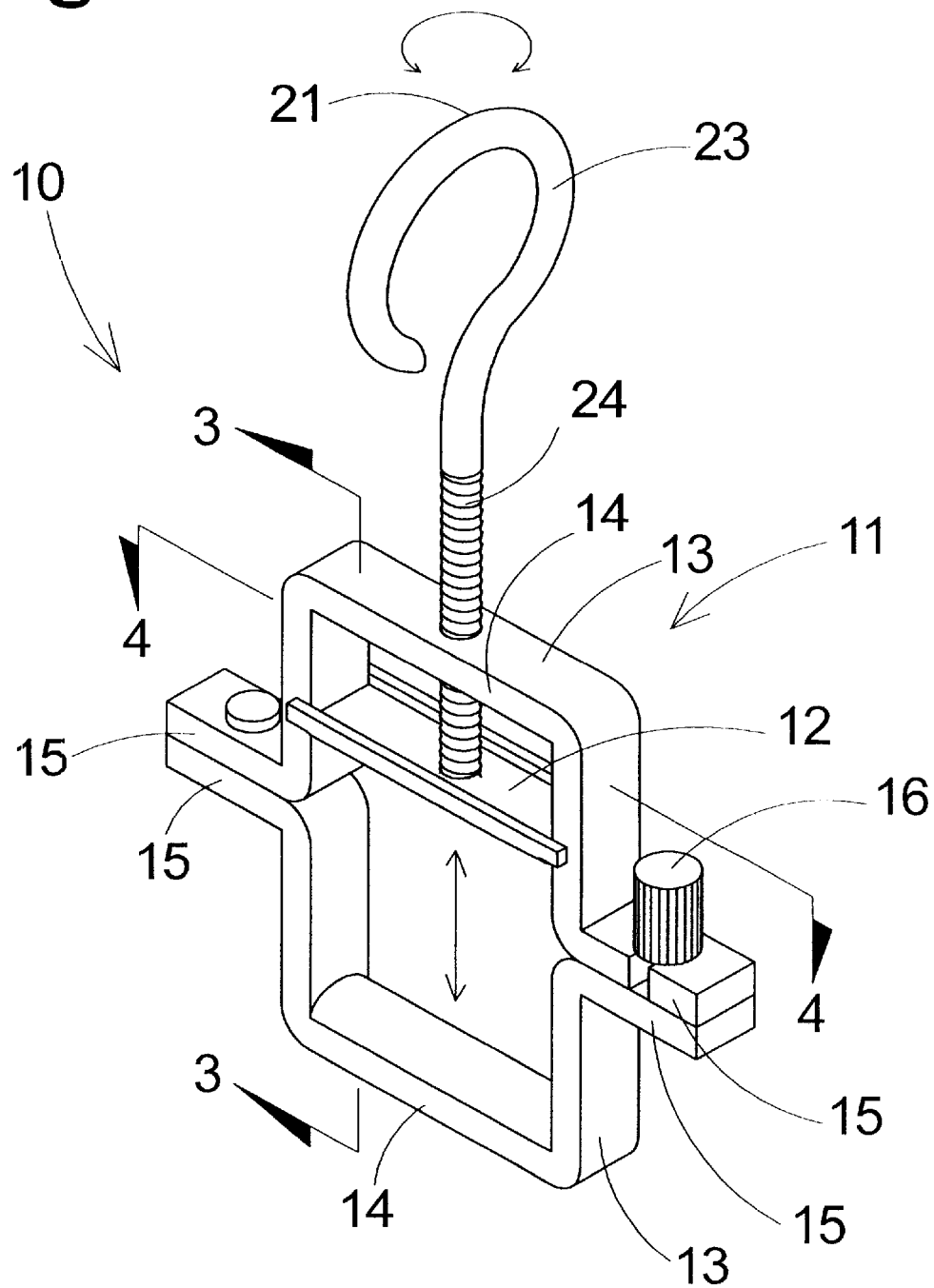
FIG. 1 is a perspective view of a new portable flow control valve according to the present invention showing the frame portions aligned.
Figure 2:
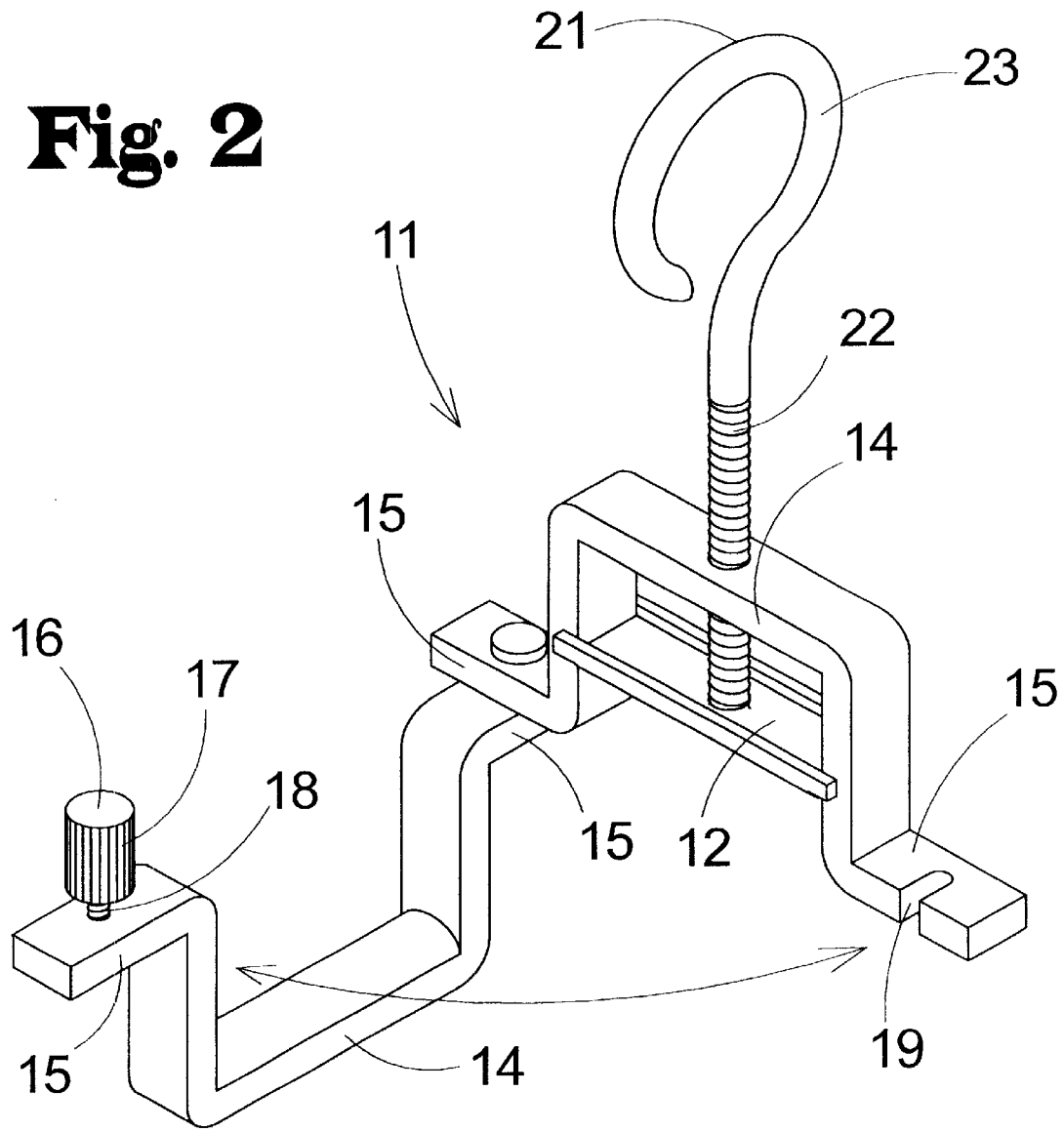
FIG. 2 is a perspective view of the present invention showing the frame portions pivoted away from each other.
Figure 3:
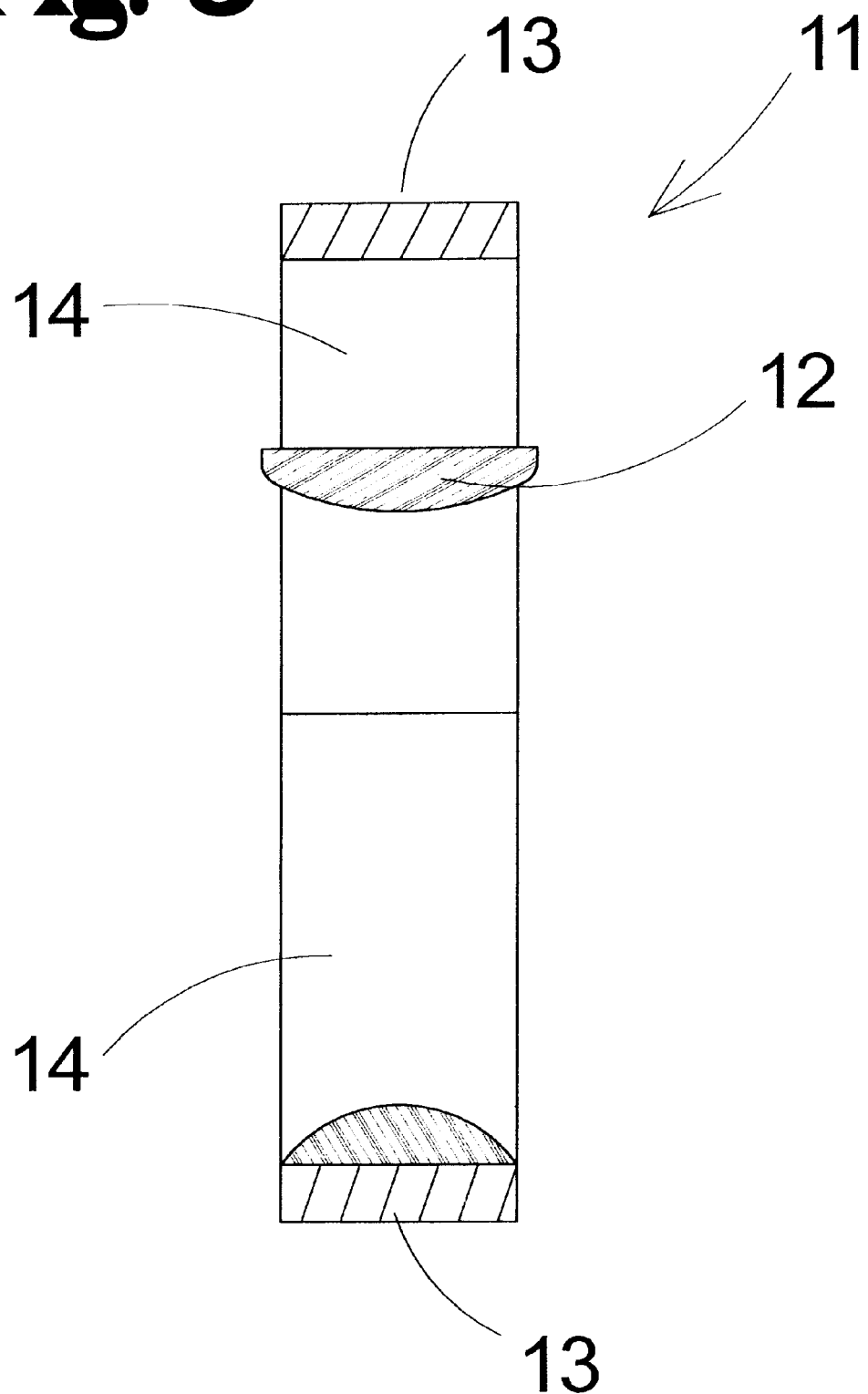
FIG. 3 is a cross-sectional view of the present invention taken along line 3—3 of FIG. 1.
Figure 4:
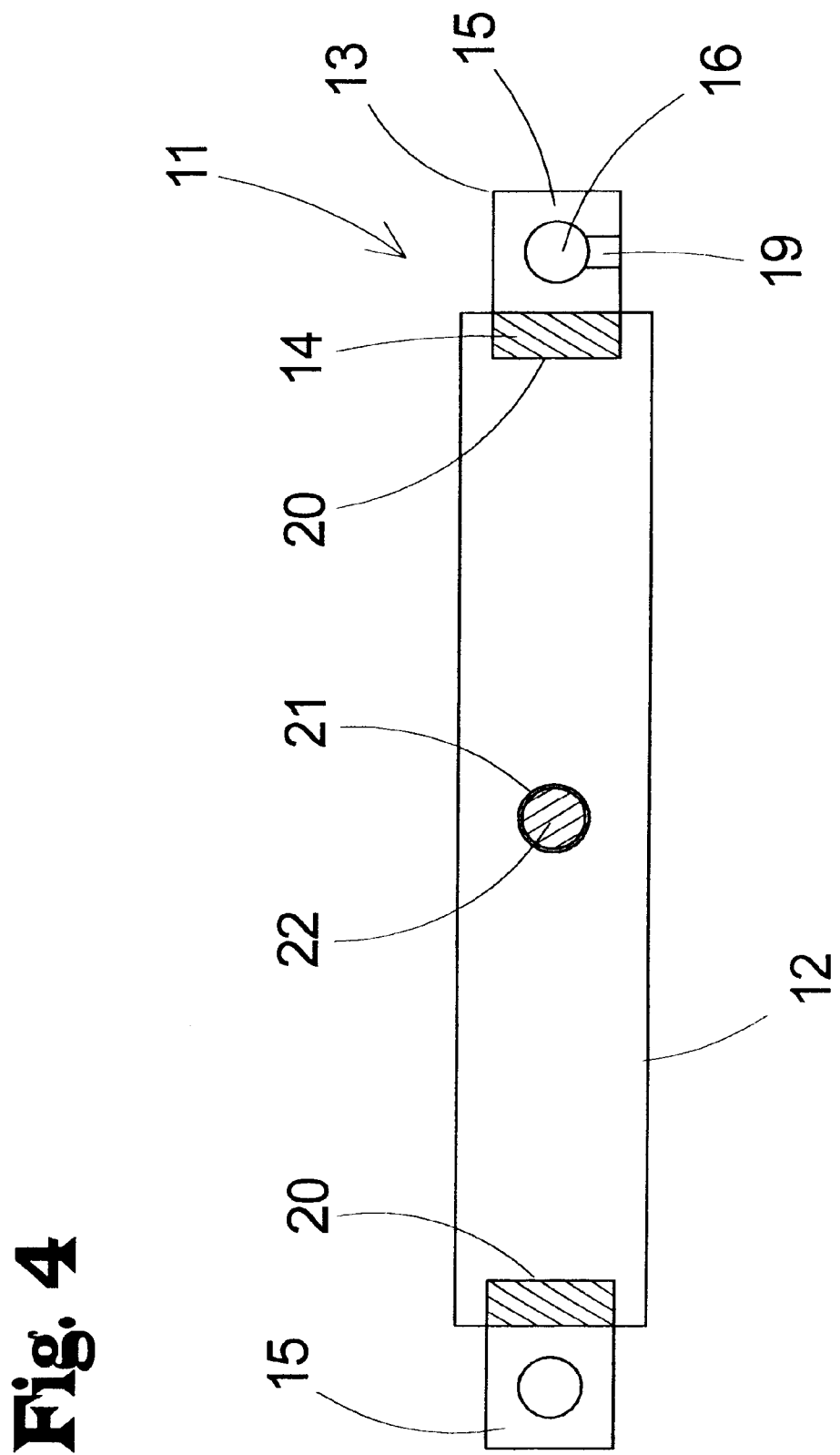
FIG. 4 is a cross-sectional view of the present invention taken along line 4—4 of FIG. 1.

With reference now to the drawings, and in particular to FIGS. 1 through 4 thereof, a new portable flow control valve embodying the principles and concepts of the present invention and generally designated by the reference numeral 10 will be described.

As best illustrated in FIGS. 1 through 4, the portable flow control valve 10 generally comprises a frame assembly 11 being designed for being selectively positioned around the conduit.

A clamping member 12 is coupled to the frame assembly 11 whereby the clamping member 12 is slidably positionable with respect to the frame assembly 11. The clamping member 12 is designed for engaging the conduit whereby the clamping member 12 is for compressing the conduit between the frame assembly 11 and the clamping member 12 for controlling the rate of flow of the fluid through the conduit beyond the clamping member 12.

The frame assembly 11 comprises a pair of frame portions 13. One of the frame portions 13 is pivotally coupled to the other one of the frame portions 13. One of the frame portions 13 is designed for receiving the conduit when one of the frame portions 13 is pivoted away from the other of the frame portions 13 whereby the conduit is positioned between the frame portions 13 when the frame portions 13 are aligned. The clamping member 12 is slidably coupled to one of the frame portions 13 whereby the clamping member 12 is designed for compressing the conduit between the clamping member 12 and the opposing one of the frame portions 13.

Each of the frame portions 13 comprises a receiving portion 14 and a pair of tab portions 15. One of the tab portions 15 is coupled to the receiving portion 14 opposite the other of the tab portions 15 of the associated one of the frame portions 13. One of the tab portions 15 of one of the frame portions 13 is pivotally coupled to one of the tab portions 15 of the other one of the frame portions 13 for permitting one of the frame portions 13 to be pivoted with respect to the other one of the frame portions 13.

A locking member 16 is coupled to one of the tab portions 15 of one of the frame portions 13. The locking member 16 engages one of the tab portions 15 of the other one of the frame portions 13 for securing the associated one of the frame portions 13 to the other one of the frame portions 13 when the frame portions 13 are aligned.

The locking member 16 comprises a head portion 17 and a rod portion 18. The rod portion 18 threadably engages the associated one of the tab portions 15 of the associated one of the frame portions 13. The head portion 17 is coupled to the rod portion 18 opposite the associated one of the frame portions 13. The rod portion 18 of the locking member 16 is selectively inserted into a slot 19 in one of the tab portions 15 of the other of the frame portions 113 whereby the locking member 16 is rotated to compress the associated one of the tab portions 15 of the other one of the frame portions 13 between the head portion 17 of the locking member 16 and the associated one of the tab portions 15 of the associated one of the frame portions 13 to secure one of the frame portions 113 to the other one of the frame portions 113 when the frame portions 13 are aligned.

The receiving portion 14 is substantially U-shaped. The receiving portion 14 of one of the frame portions 13 is designed for receiving the conduit whereby the clamping member 12 is slidably coupled to the receiving portion 14 of the other one of the frame portions 13 for allowing the clamping member 12 to compress the conduit between the clamping member 12 and the opposing one of frame portions 13.

The clamping member 12 comprises a pair of channels 20. One of the channels 20 is positioned opposite the other one of the channels 20. Each of the channels 20 slidably receives the receiving portion 14 of one of the frame portions 13 of the frame assembly 11 whereby the channels 20 are for maintaining alignment of the clamping member 12 with the frame assembly 11 when the clamping member 12 is slid with respect to the frame assembly 11.

An actuation member 21 is coupled to the clamping member 12. The actuating member is operationally coupled to the frame assembly 11 whereby the actuation member 21 is for sliding the clamping member 12 with respect to the frame assembly 11 when the actuation member 21 is actuated by a user.

The actuation member 21 comprises a threaded portion 22. The threaded portion 22 is rotatably coupled to the clamping member 12. The threaded portion 22 threadably engages the frame assembly 11 whereby rotating of the threaded portion 22 of the actuation member 21 with respect to the frame assembly 11 slides the clamping member 12 along the frame assembly 11 when the user wishes to adjust the flow of fluid through the conduit.

The actuation member 21 comprises a handle portion 23. The handle portion 23 is coupled to the threaded portion 22 opposite the clamping member 12. The handle portion 23 is designed for being engaged by a hand of the user to facilitate rotation of the threaded portion 22 to slide the clamping member 12 with respect to the frame assembly 11.

In use, the user pivots one of the frame portions 13 away from the other one of the frame portions 13. The user then positions the conduit in the receiving portion 14 of one of the frame portions 13 and pivots the frame portions 13 to align the frame portions 13. The head of the locking member 16 is rotated by the user to secure the frame portions 13 to each other. The handle portion 23 of the actuation member 21 is then rotated by the user to slide the clamping member 12 along the frame assembly 11 and compress the conduit between the clamping member 12 and the frame assembly 11 to control flow of fluid past the frame assembly 11.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable flow control valve for selectively controlling fluid flow through a conduit, the portable flow control valve comprising:
    a frame assembly being adapted for being selectively positioned around the conduit;
    a clamping member being coupled to said frame assembly such that said clamping member is slidably positionable with respect to said frame assembly, said clamping member being adapted for engaging the conduit such that said clamping member is for compressing the conduit between said frame assembly and said clamping member for controlling the rate of flow of the fluid through the conduit beyond said clamping members; and
    a compressing member being coupled frame assembly such that said compressing member is positioned opposite said clamping member, said compressing member comprising an arcuate upper face such that said arcuate upper face of said compression member is convex, said clamping member comprising an arcuate lower face such that said arcuate lower face is convex, said arcuate lower face of said clamping member arcing opposite said arcuate upper face of said compressing member such that said clamping member is adapted for compressing the conduit between said clamping member and said compressing member to control the rate of flow of fluid through the conduit, said arcuate lower face of said clamping member and said arcuate upper face of said compressing member being adapted for providing a smooth surface of contact for the conduit to inhibit the conduit being damaged during compression.

2. The portable flow control valve as set forth in claim 1, further comprising:
    said frame assembly comprising a pair of frame portions, one of said frame portions being pivotally coupled to the other one of said frame portions, one of said frame portions being adapted for receiving the conduit when one of said frame portions is pivoted away from the other of said frame portions such that the conduit is positioned between said frame portions when said frame portions are aligned, said clamping member being slidably coupled to one of said frame portions such that said clamping member is adapted for compressing the conduit between said clamping member and the opposing one of said frame portions.

3. The portable flow control valve as set forth in claim 2, further comprising:
    each of said frame portions comprising a receiving portion and a pair of tab portions, one of said tab portions being coupled to said receiving portion opposite the other of said tab portions of the associated one of said frame portions, one of said tab portions of one of said frame portions being pivotally coupled to one of said tab portions of the other one of said frame portions for permitting one of said frame portions to be pivoted with respect to the other one of said frame portions.

4. The portable flow control valve as set forth in claim 3, further comprising:
    a locking member being coupled to one of said tab portions of one of said frame portions, said locking member engaging one of said tab portions of the other one of said frame portions for securing the associated one of said frame portions to the other one of said frame portions when said frame portions are aligned.

5. The portable flow control valve as set forth in claim 4, further comprising:
    said locking member comprising a head portion and a rod portion, said rod portion threadably engaging the associated one of said tab portions of the associated one of said frame portions, said head portion being coupled to said rod portion opposite the associated one of said frame portions, said rod portion of said locking member being selectively inserted into a slot in one of said tab portions of the other of said frame portions such that said locking member is rotated to compress the associated one of said tab portions of the other one of said frame portions between said head portion of said locking member and the associated one of said tab portions of the associated one of said frame portions to secure one of said frame portions to the other one of said frame portions when said frame portions are aligned.

6. The portable flow control valve as set forth in claim 3, further comprising:

said receiving portion being substantially U-shaped, said receiving portion of one of said frame portions being adapted for receiving the conduit such that said clamping member is slidably coupled to said receiving portion of the other one of said frame portions for allowing said clamping member to compress the conduit between said clamping member and the opposing one of frame portions.

7. The portable flow control valve as set forth in claim 1, further comprising:

said clamping member comprising a pair of channels, one of said channels being positioned opposite the other one of said channels, each of said channels slidably receiving said frame assembly such that said channels are for maintaining alignment of said clamping member with said frame assembly when said clamping member is slid with respect to said frame assembly.

8. The portable flow control valve as set forth in claim 1, further comprising:

an actuation member being coupled to said clamping member, said actuating member being operationally coupled to said frame assembly such that said actuation member is for sliding said clamping member with respect to said frame assembly when said actuation member is actuated by a user.

9. The portable flow control valve as set forth in claim 8, further comprising:

said actuation member comprising a threaded portion, said threaded portion being rotatably coupled to said clamping member, said threaded portion threadably engaging said frame assembly such that rotating of said threaded portion of said actuation member with respect to said frame assembly slides said clamping member along said frame assembly when the user wishes to adjust the flow of fluid through the conduit.

10. The portable flow control valve as set forth in claim 9, further comprising:

said actuation member comprising a handle portion, said handle portion being coupled to said threaded portion opposite said clamping member, said handle portion being adapted for being engaged by a hand of the user to facilitate rotation of said threaded portion to slide said clamping member with respect to said frame assembly.

11. A portable flow control valve for selectively controlling fluid flow through a conduit, the portable flow control valve comprising:

a frame assembly being adapted for being selectively positioned around the conduit;

a clamping member being coupled to said frame assembly such that said clamping member is slidably positionable with respect to said frame assembly, said clamping member being adapted for engaging the conduit such that said clamping member is for compressing the conduit between said frame assembly and said clamping member for controlling the rate of flow of the fluid through the conduit beyond said clamping member;

said frame assembly comprising a pair of frame portions, one of said frame portions being pivotally coupled to the other one of said frame portions, one of said frame portions being adapted for receiving the conduit when one of said frame portions is pivoted away from the other of said frame portions such that the conduit is positioned between said frame portions when said frame portions are aligned, said clamping member being slidably coupled to one of said frame portions such that said clamping member is adapted for compressing the conduit between said clamping member and the opposing one of said frame portions;

each of said frame portions comprising a receiving portion and a pair of tab portions, one of said tab portions being coupled to said receiving portion opposite the other of said tab portions of the associated one of said frame portions, one of said tab portions of one of said frame portions being pivotally coupled to one of said tab portions of the other one of said frame portions for permitting one of said frame portions to be pivoted with respect to the other one of said frame portions;

a locking member being coupled to one of said tab portions of one of said frame portions, said locking member engaging one of said tab portions of the other one of said frame portions for securing the associated one of said frame portions to the other one of said frame portions when said frame portions are aligned;

said locking member comprising a head portion and a rod portion, said rod portion threadably engaging the associated one of said tab portions of the associated one of said frame portions, said head portion being coupled to said rod portion opposite the associated one of said frame portions, said rod portion of said locking member being selectively inserted into a slot in one of said tab portions of the other of said frame portions such that said locking member is rotated to compress the associated one of said tab portions of the other one of said frame portions between said head portion of said locking member and the associated one of said tab portions of the associated one of said frame portions to secure one of said frame portions to the other one of said frame portions when said frame portions are aligned;

said receiving portion being substantially U-shaped, said receiving portion of one of said frame portions being adapted for receiving the conduit such that said clamping member is slidably coupled to said receiving portion of the other one of said frame portions for allowing said clamping member to compress the conduit between said clamping member and the opposing one of frame portions;

said clamping member comprising a pair of channels, one of said channels being positioned opposite the other one of said channels, each of said channels slidably receiving said frame assembly such that said channels are for maintaining alignment of said clamping member with said frame assembly when said clamping member is slid with respect to said frame assembly;

an actuation member being coupled to said clamping member, said actuating member being operationally coupled to said frame assembly such that said actuation member is for sliding said clamping member with respect to said frame assembly when said actuation member is actuated by a user;

said actuation member comprising a threaded portion, said threaded portion being rotatably coupled to said clamping member, said threaded portion threadably engaging said frame assembly such that rotating of said threaded portion of said actuation member with respect to said frame assembly slides said clamping member along said frame assembly when the user wishes to adjust the flow of fluid through the conduit; and said actuation member comprising a handle portion, said handle portion being coupled to said threaded portion opposite said clamping member, said handle portion being adapted for being engaged by a hand of the user to facilitate rotation of said threaded portion to slide said clamping member with respect to said frame assembly.

* * * * *